(12) United States Patent  (10) Patent No.: US 7,929,045 B2
Kinoshita et al.              (45) Date of Patent:     Apr. 19, 2011

(54) SOLID-STATE IMAGE PICKUP DEVICE AND ELECTRONIC APPARATUS INCLUDING SAME

(75) Inventors: Kazuo Kinoshita, Fukuyama (JP); Katsuitsu Nishida, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 370 days.

(21) Appl. No.: 12/213,022

(22) Filed: Jun. 13, 2008

(65) Prior Publication Data

US 2008/0309814 A1    Dec. 18, 2008

(30) Foreign Application Priority Data

Jun. 15, 2007  (JP) .................................. 2007-159366

(51) Int. Cl.
  *G02B 13/16*  (2006.01)
  *G02B 7/02*   (2006.01)
  *H04N 5/225*  (2006.01)
(52) U.S. Cl. ......... 348/355; 348/440; 359/811; 359/819
(58) Field of Classification Search .................. 348/335, 348/340; 359/811, 819
  See application file for complete search history.

(56) References Cited

U.S. PATENT DOCUMENTS

| 5,581,412 | A    | 12/1996  | Tanaka |              |
|-----------|------|----------|--------|--------------|
| 6,483,101 | B1 * | 11/2002  | Webster | ......... 250/216 |
| 7,018,112 | B2 * | 3/2006   | Franiatte | ......... 385/91 |
| 7,038,865 | B2 * | 5/2006   | Ito et al. | ......... 359/819 |
| 7,061,697 | B2 * | 6/2006   | Magni et al. | ...... 359/811 |
| 7,196,332 | B2 * | 3/2007   | Wear et al. | ........... 250/370.01 |
| 7,196,857 | B2 * | 3/2007   | Kazama | ...................... 359/811 |
| 7,460,317 | B2 * | 12/2008  | Webster et al. | ......... 359/811 |
| 7,511,261 | B2 * | 3/2009   | Hsin et al. | ............... 250/239 |
| 7,576,401 | B1 * | 8/2009   | de Guzman et al. | ...... 257/432 |
| 2002/0005997 | A1 * | 1/2002 | Oba | ........................... 359/819 |
| 2004/0076106 | A1 | 4/2004  | Yamamoto et al. | |
| 2004/0224245 | A1 | 11/2004 | Shigezaki et al. | |
| 2006/0152826 | A1 | 7/2006  | Tsutsui | |
| 2006/0290801 | A1 | 12/2006 | Jao | |
| 2007/0008631 | A1 | 1/2007  | Webster et al. | |
| 2007/0067786 | A1 | 3/2007  | Yamamoto et al. | |
| 2007/0165136 | A1 * | 7/2007 | Wu et al. | ..................... 348/373 |

(Continued)

FOREIGN PATENT DOCUMENTS

CN            1333473 A         1/2002

(Continued)

*Primary Examiner* — Nhan T Tran
*Assistant Examiner* — Tuan H Le
(74) *Attorney, Agent, or Firm* — Edwards Angell Palmer & Dodge LLP; David G. Conlin; Catherine J. Toppin

(57) ABSTRACT

A camera module 1 includes: an optical structure 3 that forms a subject image and moves up and down along an optical path; a solid-state image pickup element 21 that converts, into an electrical signal, a subject image formed by the optical structure 3; a lens holder 4, holding the optical structure 3 therein, which contains the solid-state image pickup element 21, the optical structure 3 having a cushioning member 34 so provided on a back surface thereof as to absorb the impact of contact between the optical structure 3 and the holding section 4. The cushioning member 34 has a removing section for, when in contact with a contact surface 4a of the holding section 4, removing dust D on the contact surface 4a outward from the contact surface 4a. This makes it possible to provide a small camera module 1 while preventing (reducing) dust from causing an image defect.

7 Claims, 8 Drawing Sheets

U.S. PATENT DOCUMENTS

| | | | |
|---|---|---|---|
| 2007/0188649 A1* | 8/2007 | Hagihara et al. | 348/335 |
| 2007/0206109 A1* | 9/2007 | Tu et al. | 348/340 |

FOREIGN PATENT DOCUMENTS

| | | |
|---|---|---|
| CN | 1467571 A | 1/2004 |
| CN | 1508801 A | 6/2004 |
| JP | 62-261158 | 11/1987 |
| JP | 7-225332 A | 8/1995 |
| JP | 2002-062462 | 2/2002 |
| JP | 2004-282142 | 10/2004 |
| JP | 2005-051524 | 2/2005 |
| JP | 2005-217546 | 8/2005 |
| JP | 2006-042230 | 2/2006 |
| JP | 2006-058662 | 3/2006 |
| JP | 2006-163006 | 6/2006 |
| JP | 2006-235575 | 9/2006 |
| JP | 2006-284841 | 10/2006 |
| JP | 2006-293100 | 10/2006 |
| JP | 2007-006502 | 1/2007 |
| JP | 2007-20191 | 1/2007 |
| JP | 2007-052076 | 3/2007 |
| KR | 10-2005-0113982 A | 12/2005 |
| WO | WO-2006/073920 | 7/2006 |

\* cited by examiner

SOLID-STATE IMAGE PICKUP DEVICE AND ELECTRONIC APPARATUS INCLUDING SAME

This Nonprovisional application claims priority under 35 U.S.C. §119(a) on Patent Application No. 159366/2007 filed in Japan on Jun. 15, 2007, the entire contents of which are hereby incorporated by reference.

FIELD OF THE INVENTION

The present invention relates to a solid-state image pickup device that can be made smaller while preventing dust from adhering onto the optical path when the solid-state image pickup device is manufactured or used.

BACKGROUND OF THE INVENTION

A camera module (solid-state image pickup device) for use in a mobile phone or the like is a module integrally constituted by a solid-state image pickup element (CCD (charge-coupled device) or a CMOS (complementary metal-oxide semiconductor) sensor IC (integrated circuit)), an infrared filter, and a printed-circuit board having terminals, a lens, and a lens holder. Recently, in order to miniaturize a camera module, a process for manufacturing a miniature solid-state image pickup element has been developed. As the size of a camera module becomes smaller, fine dust (e.g., of not less than 25 μm) existing on the optical path causes an image defect. Such an image defect is caused when the shadow of dust on the optical path is projected as a black dot or a stain onto a shot image. It should be noted that the optical path of a camera module is indicated by a line connecting a lens with a light-receiving portion of a solid-state image pickup element.

Examples of the dust that causes such an image defect include dust having already adhered to a component of the camera module at the time of arrival of the component and dust generated in process of manufacture. It should be noted here that the dust having already adhered at the time of arrival is often formed from fine resin chips. Meanwhile, the dust generated in process of manufacture is often formed from metal. Such metal is generated by the abrasion of an apparatus for manufacturing (assembling) a camera module.

If the dust thus generated adheres onto the optical path, the dust can be removed at the time of shipping inspection included in a process for manufacturing a camera module. However, dust temporarily adhering to a portion other than the optical path cannot be removed at the time of shipping inspection; therefore, the camera module is shipped as a conforming article. For this reason, when the camera module thus shipped is shocked or vibrated during conveyance or transportation of the camera module, the temporarily-adhering dust moves and adheres onto the optical path. This causes an image defect at the place (user source, e.g., a camera-equipped mobile phone seller) to which the camera module has been shipped.

One of the conventional measures against such an image defect is to screen dust having already adhered to a component of a camera module at the time of delivery of the component. Moreover, depending on the extent to which the dust adheres, the dust is blown away with use of a air blower, washed away with use of ultrasonic waves, washed away with HFE (hydrofluoroether).

Meanwhile, in order to prevent dust generated in process of manufacture from adhering to a component of a camera module, an attempt to raise standards of cleanliness of a manufacturing line has been made. For example, manufacturing is performed in a clean room cut off from the outside world.

However, such an attempt requires facility investment, control of maintenance, manufacturing process maintenance (e.g., apparatus cleaning and component replacement), and the like. That is, the installation of a clean room, the investment in facilities for air circulation (e.g., air curtains, air circulators, filtration facilities, and cleaning facilities) and the like, and the control of maintenance of those facilities involve enormous cost. Moreover, as described above, even if dust is prevented from entering at the time of assembly of a camera module in a clean room, there is a possibility that dust is generated in the clean room. For this reason, the securement of standards of cleanliness in manufacturing processes is no longer sufficient to remove dust.

In view of this, each of Patent Documents 1 and 2 discloses a solid-state image pickup device that employs an adhesive material to catch dust that causes an image defect.

FIG. 20 is a cross-sectional view of the solid-state image pickup device of Patent Document 1. According to this arrangement, a space formed by a package 111, a solid-state image pickup element 112, and a sealing glass 114 (i.e., an inner wall surface of the package 111) is coated with an adhesive material 115. The adhesive material 115 catches dust 113 generated in the space.

Meanwhile, FIG. 21 is a cross-sectional view of the solid-state image pickup device of Patent Document 2. According to this arrangement, a charged film 230 is provided in a space 220 zoned by the inner side of a concave portion 218 of a lens holder 216 and a substrate 202. Furthermore, an adhesive material 234 is provided on the charged film 230 so as to be exposed to the space 220. The adhesive material 234 catches dust 232 sucked by the charged film 230 with electrostatic action.

Further, Patent Document 3 discloses a solid-state image pickup device that prevents dust from adhering to a solid-state image pickup element. FIG. 22 is a cross-sectional view of the solid-state image pickup device of Patent Document 3. According to this solid-state image pickup device, threads (including an inner thread 308 and an outer thread 324) for fastening a lens barrel 320 and a lens-barrel-attaching frame 322 together are formed outside of the lens-barrel-attaching frame 322. With this, dust generated by friction between the lens barrel 320 and the lens-barrel-attaching frame 322 at the time of adjusting focus by adjusting the distance between the lens barrel 320 and a solid-state image pickup element 327 can be prevented from adhering to the solid-state image pickup element 327.

However, the conventional arrangements are insufficient to take measures against dust and incapable of miniaturizing a solid-state image pickup device.

Specifically, as described above, the arrangement of Patent Document 1 employs the adhesive material 115, provided in the same space as the solid-state image pickup element 112, to catch dust. Meanwhile, the arrangement of Patent Document 2 employs the adhesive material 234 not only to simply catch dust, but also to catch dust sucked by the charged film 230.

However, the arrangement of Patent Document 1 cannot prevent dust from adhering onto a surface of the sealing glass 114 that lies on a line extending from the solid-state image pickup element 112. That is, the arrangement of Patent Document 1 cannot prevent dust from adhering onto the optical path. For this reason, the dust causes an image defect.

Further, the arrangement of Patent Document 2 employs the charged film 230 to suck dust. However, the charged film 230 is provided also in the optical path. For this reason, even if the adhesive material 234 is not provided in the optical path, dust is attracted toward the charged film 230 provided in the optical path. Moreover, the adhesive material 234 is not provided so as to face a lens unit 212. As a result, dust adheres onto both sides of the charged film 230 provided in the optical path. Thus, the arrangement of Patent Document 2 also cannot prevent dust from adhering onto the optical path, and therefore suffers from an image defect.

Moreover, the arrangement of Patent Document 2 suffers from such a problem that the static electricity with which dust is sucked causes a malfunction in the solid-state image pickup device 206 and such a problem that there is dust, such as metal dust, which cannot be sucked with static electricity.

Meanwhile, the arrangement of Patent Document 3 does not employ an adhesive material or static electricity as Patent Documents 1 and 2 do. Moreover, since dust is generated outside of the lens-barrel-attaching frame 322, no dust adheres to the solid-state image pickup element 327. However, the threads for fastening the lens barrel 320 and the lens-barrel-attaching frame 322 together need to be provided outside of the lens-barrel-attaching frame 322. This makes it necessary not only to provide a convex pedestal 325 on an outer circumferential surface of the lens-barrel-attaching frame 322 so that the convex pedestal 325 extends from the outer circumferential surface of the lens-barrel-attaching frame 322, but also to provide the lens barrel 320 with a second barrel 304 having the inner thread 308 provided on an inner surface thereof. This undesirably causes an increase in the size of the solid-state image pickup device of Patent Document 3.

[Patent Document 1]
Japanese Unexamined Patent Application Publication No. 261158/1987 (Tokukaisho 62-261158; published on Nov. 13, 1987)

[Patent Document 2]
Japanese Unexamined Patent Application Publication No. 42230/2006 (Tokukai 2006-42230; published on Feb. 9, 2006)

[Patent Document 3]
Japanese Unexamined Patent Application Publication No. 06502/2007 (Tokukai 2007-06502; published on Jan. 11, 2007)

SUMMARY OF THE INVENTION

The present invention has been made in view of the foregoing problems. It is an object of the present invention to provide a small solid-state image pickup device while preventing dust from causing an image defect.

In order to attain the foregoing object, a solid-state image pickup device of the present invention includes: an optical structure that forms a subject image and moves up and down along an optical path; a solid-state image pickup element that converts, into an electrical signal, a subject image formed by the optical structure; and a holding section, holding the optical structure therein, which contains the solid-state image pickup element, the holding section having a contact surface that makes contact with a back surface of the optical structure, the optical structure having a cushioning member so provided on the back surface thereof as to absorb an impact of contact between the optical structure and the holding section, the cushioning member having a removing section for, when in contact with the contact surface of the holding section, removing dust on the contact surface outward from the contact surface.

According to the foregoing arrangement, the optical structure has the cushioning member provided on the back surface thereof. Therefore, even if the optical structure moves down to make contact with the contact surface of the holding section, the impact of contact can be absorbed. Further, according to the foregoing arrangement, the holding section holds the optical structure therein. Therefore, the size of the solid-state image pickup device is not increased.

Moreover, according to the foregoing arrangement, the cushioning member has the removing section for removing dust on the contact surface outward from the contact surface. With this, when the optical structure moves down and the cushioning member provided on the back surface of the optical structure and the contact surface of the holding section make contact, the dust on the contact surface can be kept away from the optical path by the removing section. This makes it possible to prevent (or reduce) an image defect from being caused by dust generated when the solid-state image pickup device is manufactured or used.

Thus, the foregoing arrangement makes it possible to realize a small solid-state image pickup device while preventing (or reducing) dust from causing an image defect.

Additional objects, features, and strengths of the present invention will be made clear by the description below. Further, the advantages of the present invention will be evident from the following explanation in reference to the drawings.

DESCRIPTION OF THE EMBODIMENTS

An embodiment of the present invention will be described below with reference to FIGS. 1 through 19.

A solid-state image pickup device of the present invention includes a nonmetallic cushioning member provided between an optical structure and a holding section, thereby realizing a small solid-state image pickup device while preventing dust from being generated when the solid-state image pickup device is manufactured or used.

The solid-state image pickup device of the present invention is suitable to an electronic apparatus, such as a camera-equipped mobile phone, a digital still camera, or a security camera, which is capable of taking photographs. The present embodiment describes a camera module (solid-state image pickup device) for use in a camera-equipped mobile phone.

Figure 2:
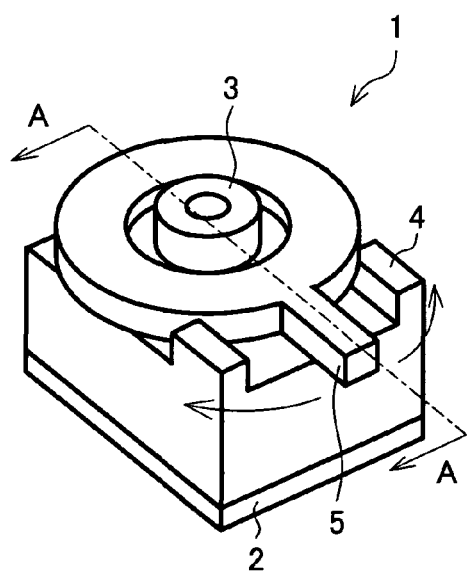
FIG. 2 is a perspective view of the camera module of FIG. 1.

FIG. 2 is a perspective view of the appearance of the camera module of the present embodiment. As shown in FIG. 2, the camera module 1 is integrally constituted by a wiring board 2, an optical structure 3, a lens holder 4, and a lever 5. That is, the lens holder 4 is provided on the wiring board 2 so as to hold the optical structure 3 for taking an image, and the lever 5 for switching between shooting modes is formed on the lens holder 4. The lever 5 has an opening formed in a central part thereof, and the optical structure 3 is exposed from the opening. For convenience of explanation, the side that faces the optical structure 3 is referred to as "front side (upper side)", and the side that faces the wiring board 2 is referred to as "back side (lower side)".

Figure 1:
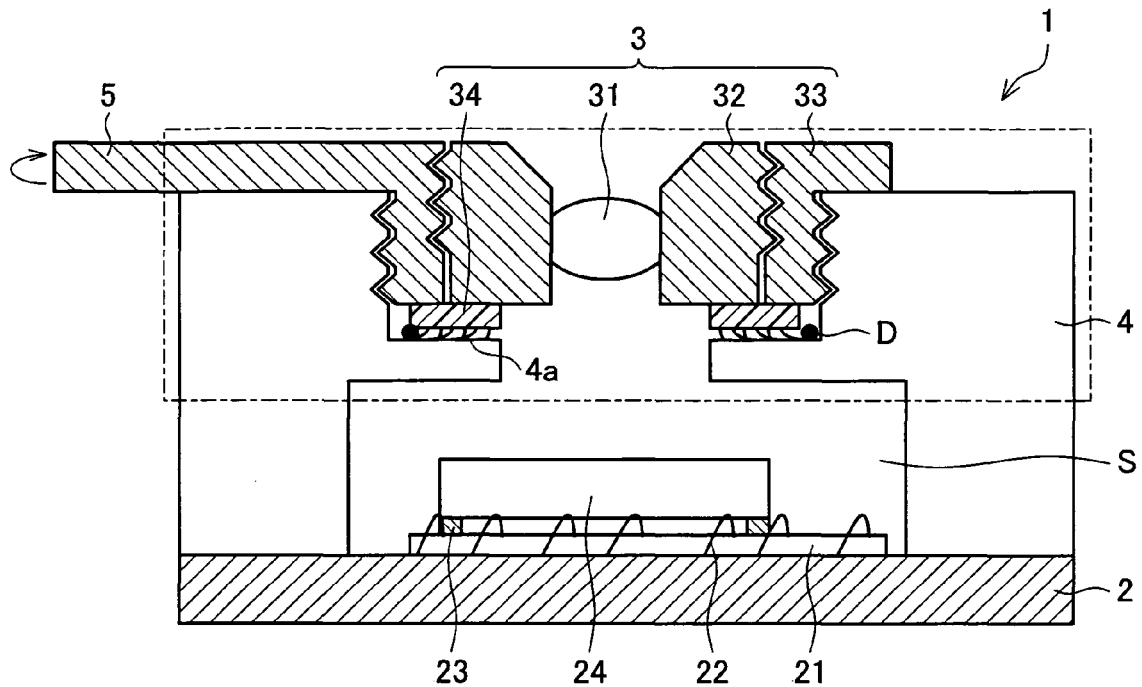
FIG. 1 is a cross-sectional view of a camera module of the present invention.

The following fully describes an arrangement of each component of the camera module 1 with reference to FIG. 1. FIG. 1 is a cross-sectional view of the camera module 1 taken along Line A-A of FIG. 2.

The wiring board 2 is a board having wires (not shown) patterned thereon. The wiring board 2 has a solid-state image pickup element 21 provided in a central part thereof. The wiring board 2 and the solid-state image pickup element 21 are electrically connected via boding wires 22 so as to be able to exchange electrical signals with each other.

The solid-state image pickup element 21 converts, into an electrical signal, a subject image formed by the optical structure 3. That is, the solid-state image pickup element 21 is a sensor device that photoelectrically converts incident light coming from the optical structure 3. The solid-state image pickup element 21 has a light-receiving surface (not shown) formed on a front surface (upper surface) thereof, and the light-receiving surface has a plurality of pixels disposed thereon in a matrix manner. Moreover, the solid-state image pickup element 21 converts, into an electrical signal, an optical image formed on the light-receiving surface, and outputs the electrical signal as an analog image signal. The solid-state image pickup element 21 is a CCD or a CMOS sensor IC, for example.

The solid-state image pickup element 21 has an adhesive section 23 disposed thereon and a transparent lid section 24 disposed on the adhesive section 23. The transparent lid section 24 is disposed vis-à-vis the solid-state image pickup element 21 so as to cover at least an effective pixel region where the solid-state image pickup element 21 has a plurality of light-receiving elements disposed on a surface thereof. The transparent lid section 24 is made of transparent material such as glass. Since the transparent lid section 24 is disposed above the solid-state image pickup element 21 via the adhesive section 23, the solid-state image pickup element 21 (effective pixel region) and the transparent lid section 24 do not make contact with each other. Further, the size of the transparent lid section 24 is smaller than the size of the solid-state image pickup element 21. Since the transparent lid section 24 is thus disposed so as to cover the effective pixel region of the solid-state image pickup element 21, the effective pixel region can be protected from the outside world. That is, the effective pixel region can be protected from external humidity, dust (swarf), and the like. Further, the transparent lid section 24 has an IR protection coating; therefore, the transparent lid section 24 has a function of shielding external infrared radiation.

Also provided on the wiring board 2 are electronic components such as a DSP (digital signal processor) for adjusting an optical axis, a CPU for executing various computations in accordance with a program, a ROM in which to store the program, and a RAM in which to store data on each process stage or the like. These electronic components perform overall control on the camera module 1.

The optical structure 3 is a shooting optical system that forms a subject image. That is, the optical structure 3 is an optical system for forming an image on the solid-state image pickup element 21 in accordance with light from a subject. Further, the optical structure 3 can be moved up and down along the optical path by moving the lever 5. The optical structure 3 includes a lens section 32 having a lens 31 held in the center thereof, a lens barrel 33 for holding the lens section 32, and a cushioning member 34 for absorbing the impact of contact made between the optical structure 3 and the lens holder 4 when the lever 5 is moved. The optical axis of the lens 31 is identical to the central axis of the lens barrel 33. In the present embodiment, the lens section 32 and the lens barrel 33 are each made of resin.

The cushioning member 34 is disposed on a back surface of the optical structure 3 so as not to block the optical path of the optical structure 3. Further, the cushioning member 34 is disposed so as to leave a space between an outer surface of the cushioning member 4 and the lens holder 4. In the present embodiment, the cushioning member 34 is joined to the back surface of the optical structure 3, and is made of nonmetallic material. As described below, the cushioning member 34 is designed to remove dust D on the lens holder 4. The cushioning member 34 will be described below in detail.

The lens holder 4 is a cylindrical member made of resin. The lens holder 4 holds the optical structure 3 in an upper portion thereof. The lens holder 4 has a space S provided in a lower portion thereof. The space S contains (seals in) the solid-state image pickup element 21. Further, the lens holder 4 has a central part that protrudes inward (toward the center) from an inner surface of the lens holder 4, thereby forming a contact surface 4a that makes contact with the back surface of the optical structure 3 (i.e., the cushioning member 34).

Such a camera module 1 takes an image by causing the solid-state image pickup element 21 to receive incident light having traveled through the lens 31 and the transparent lid section 24.

Here, the camera module 1 of the present embodiment has a macro function, and therefore can switch between a normal shooting mode and a close-up mode. An operation for switching between the modes is performed by moving up and down the optical structure 3 (lens section 32 and the lens barrel 33) with use of the lever 5. The optical structure 3 is moved up and down along the optical path by moving the lever 5. The lever 5 protrudes from the camera-equipped mobile phone so that the user can move the lever 5. For example, the focal length is adjusted to the normal shooting mode by moving the lever 5 down to the left, and the focal length is adjusted to the close-up mode by moving the lever 5 down to the right.

Those portions of the lens holder 4 and the lens barrel 33 which make contact with each other are threaded so that the lens holder 4 and the lens barrel 33 engage with each other, and those portions of the lens section 32 and the lens barrel 33 which make contact with each other are threaded so that the lens section 32 and the lens barrel 33 engage with each other. This makes it possible to smoothly move each component by moving the lever 5.

Figure 3:
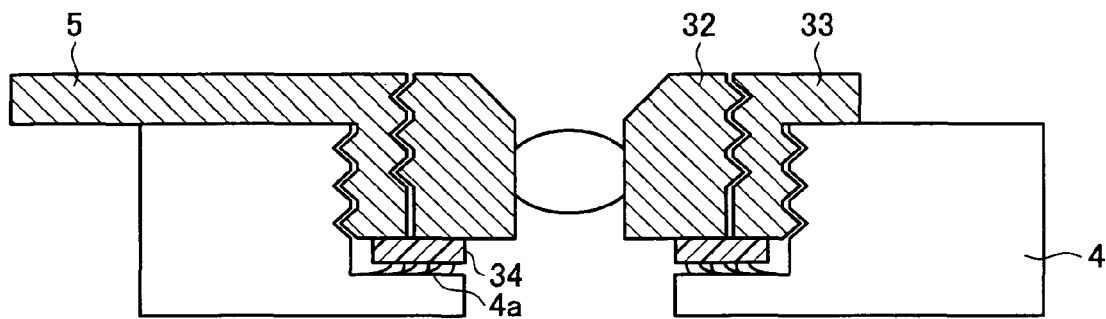
FIG. 3 is a cross-sectional view of an optical structure in a normal shooting mode of the camera module of FIG. 1.
Figure 4:
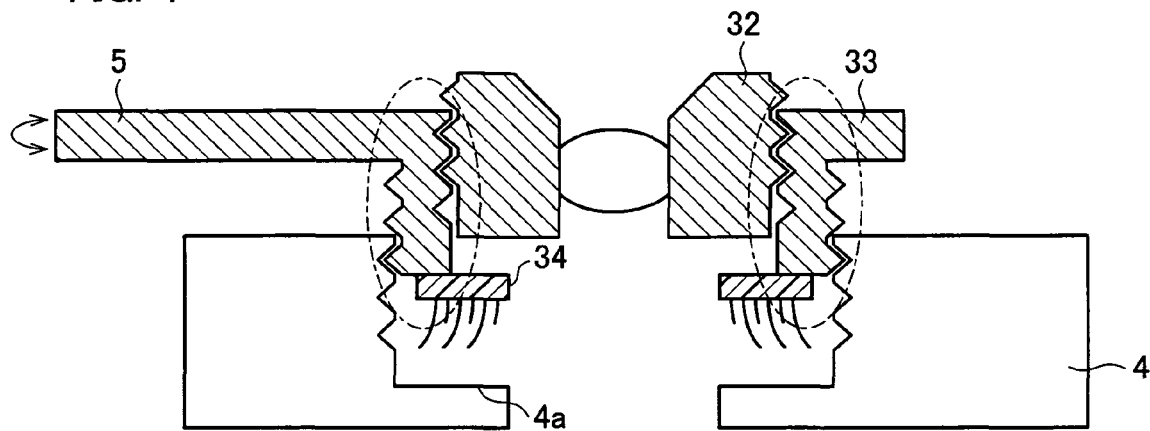
FIG. 4 is a cross-sectional view of the optical structure during a transition from the normal shooting mode to a close-up mode of the camera module of FIG. 1.
Figure 5:
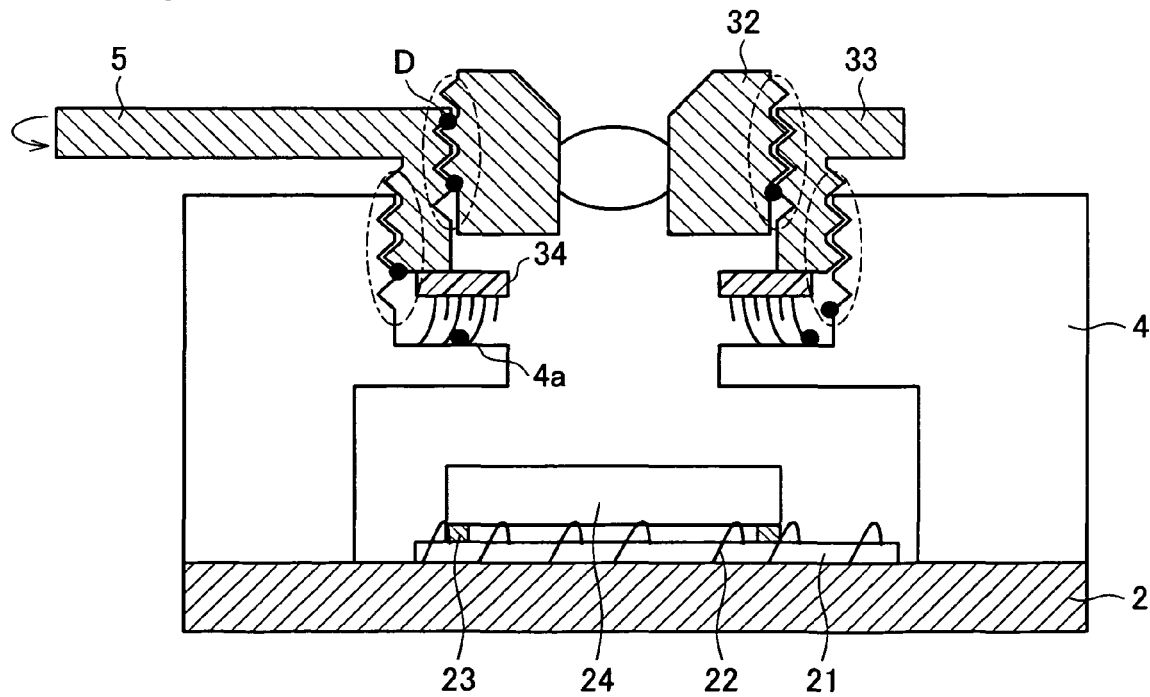
FIG. 5 is a cross-sectional view of the optical structure in the close-up mode of the camera module of FIG. 1.

FIGS. 3 through 5 are cross-sectional views that explain the macro function of the camera module 1, and show states of the optical structure 3. FIG. 3 shows the normal shooting mode. FIG. 4 shows a transition from the normal shooting mode to the close-up mode. FIG. 5 shows the close-up mode.

As shown in FIGS. 3 through 5, the lens section 32 and the lens 3 are movable. Therefore, the lens section 32 and the lens 3 move when the modes are switched back and forth by moving the lever 5. This causes the lens 31 moves so that the focal length is adjusted to each mode. The focal length is set for each mode in advance so as to come into focus in that mode. The "focal length" here means the distance between the center of the lens 31 and an imaging area of the solid-state image pickup element 21. Thus, the modes are switched back and forth by repeating the states of FIGS. 3 through 5. Further, when the modes are switched back and forth by moving the lever 5, the cushioning member 34 also moves up and down as the optical structure 3 moves up and down, so that the cushioning member 34 is driven to shift from a state (see FIG. 3) of contact with the contact surface 4*a* of the lens holder 4 to a state (see FIG. 4 or 5) of noncontact with the contact surface 4*a* or vice versa.

At the time of switching between the modes, for example, at the time of transition from the state of FIG. 3 to the state of FIG. 4, there appear sites of friction between the lens section 32 and the lens barrel as indicated by the portions surrounded by the dotted lines in FIG. 4. Similarly, at the time of transition from the state of FIG. 4 to the state of FIG. 5, there appear sites of friction (portions surrounded by the dotted lines) between the lens barrel 33 and the lens holder 4. For this reason, the use of the camera module 1 causes the sites of friction to generate the dust D.

Moreover, in addition to the dust generated from the sites of friction, the camera module 1 has dust having already adhered to an inner part thereof. That is, the camera module 1 contain dust that entered the camera module 1 in process of manufacture and was not detected at the time of shipping inspection. For this reason, when the camera module 1 is shocked or vibrated, the dust moves inside of the camera module 1.

Thus, the camera module 1 may contain dust generated from a site of friction during use (dust generated when the camera module 1 is used) and dust having entered in process of manufacture (dust generated when the camera module 1 is manufactured). If such dust adheres onto the optical path, the shadow of the adhering dust is projected as a black dot or a stain onto a shot image. That is, the dust having adhered onto the optical path causes an image defect. The dust D, which causes such an image defect, is particularly likely to gather on the contact surface 4*a* of the lens holder 4.

Figure 6:
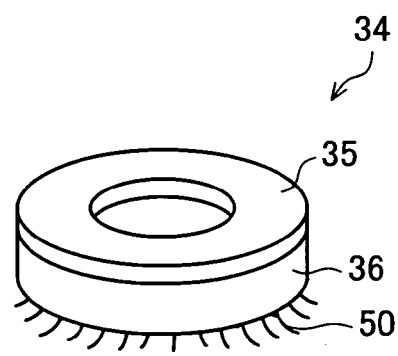
FIG. 6 is a perspective view of a cushioning member of the camera module of the present invention.

In view of this, the camera module 1 includes removing section for, when in contact with the contact surface 4*a* of the lens holder 4, removing dust on the contact surface 4*a* outward from the contact surface 4*a*. Specifically, FIG. 6 is a perspective view of the cushioning member 34. In the present embodiment, the cushioning member 34 is constituted by a first member 35 that makes contact with the back surface of the optical structure 3 and a second member 36 that makes contact with the contact surface 4*a* of the lens holder 4. The cushioning member 34 (first member 35 and the second member 36) has an opening formed in a central part thereof, thereby ensuring an optical path from the optical structure 3 to the solid-state image pickup device 21. As long as the cushioning member 34 ensures the optical path from the optical structure 3 to the solid-state image pickup device 21, the cushioning member 34 may be arranged so as not to have an opening. For example, the optical path is ensured also in cases where the cushioning member 34 is made of transparent material. The first member 35 and the second member 36 may be a single member, or may be a combination of members independent of each other.

Figure 7:
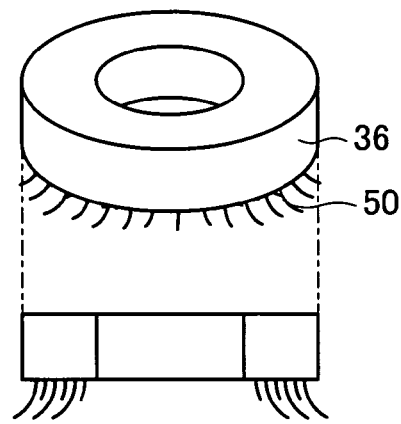
FIG. 7 shows an arrangement of a second member of the cushioning member of FIG. 6.
Figure 8:
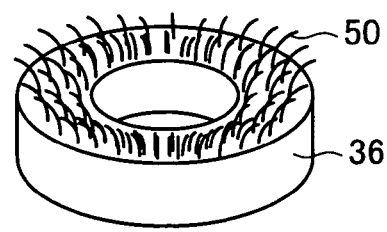
FIG. 8 is a back view of the second member of FIG. 7.

As shown in FIG. 6, the cushioning member 34 includes a brush 50 as the removing section for, when in contact with the contact surface 4*a* of the lens holder 4, removing dust on the contact surface 4*a* outward from the contact surface 4*a*. FIG. 7 shows an arrangement of the second member 36 of the cushioning member 34 of FIG. 6, and FIG. 8 is a back view of the second member 36. According to the present embodiment, as shown in FIGS. 7 and 8, the brush 50 has bristles so provided on the back surface of the cushioning member 34 (i.e., the back surface of the optical structure 3) as to be curled outward from the back surface of the cushioning member 34. Furthermore, the brush 50 has bristles of different lengths, the shorter and longer ones of which are provided alternately in a circumferential direction.

Thus, when the brush 50 is provided on the back surface of the cushioning member 34, the dust D gathering on the contact surface 4*a* as shown in FIG. 5 is removed outward from the contact surface 4*a* by the brush 50, for example, during a transition from (i) a state in which the cushioning member 34 and the contact surface 4*a* are out of contact with each other as shown above in FIG. 4 to (ii) a state in which a descent of the lens barrel 33 brings the cushioning member 34 and the contact surface 4*a* into contact with each other as shown in FIG. 3. That is, by making contact with the contact surface 4*a*, the brush 50 sweeps out the dust D on the contact surface 4*a*, so that the dust D can be kept away from the optical path. This makes it possible to surely prevent (or reduce) an image defect from being caused by the dust D generated when the camera module 1 is manufactured or used.

Moreover, when the brush 50 has bristles, as shown in FIGS. 7 and 8, so provided on the back surface of as to be curled outward from the back surface, the brush 50 surely sweeps the dust D on the contact surface 4*a* outward from the contact surface 4*a*, so that the dust D can be surely kept away from the optical path.

Furthermore, when the brush 50 has short and long bristles as shown in FIGS. 7 and 8, all the bristles of the brush 50 functions, at the time of contact of the brush 50 with the contact surface 4*a* (at the time of descent of the optical structure 3), to sweep out the dust D on the contact surface 4*a*. Meanwhile, when the brush 50 is taken out of contact with the contact surface 4*a* (at the time of ascent of the optical structure 3), the shorter ones of bristles are taken out of contact with the contact surface 4*a* sooner than the longer ones of bristles. This makes it possible to prevent (reduce) the dust D removed toward the outside of the contact surface 4*a* from returning to the inside of the contact surface 4*a* (returning to the optical path).

Figure 9:
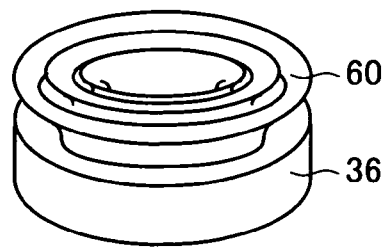
FIG. 9 is a back view of an arrangement of another second member of the cushioning member of FIG. 6.

In FIGS. 6 through 8, the removing section is the brush 50 provided on the back surface of the cushioning member 34. However, the brush 50 may be replaced by a cushioning member 34 whose back surface takes a multiple-horn (multiple-cone) shape as shown in FIG. 9. FIG. 9 shows an arrangement of a cushioning member 34 (second member 36) whose back surface is in the shape of a multiple-horn structure 60. In other words, the multiple-horn structure 60 is in the shape of a multiple-trumpet structure, a multiple-speaker-like structure, or an anemostat-like structure. Further, the multiple-horn structure 60 of FIG. 9 can be said to be in the shape of multiple truncated cones sharing a common base with one another (having concentric bases).

As with the brush 50 of FIGS. 7 and 8, the multiple-horn structure 60 of FIG. 9 takes a shape curved toward the outside of the back surface of the cushioning member 34. With this, as with the brush 50, when the multiple-horn structure 60 makes contact with the contact surface 4a, the multiple-horn structure 60 surely sweeps the dust D on the contact surface 4a outward from the contact surface 4a, so that the dust can be surely kept away from the optical path.

Figure 17:
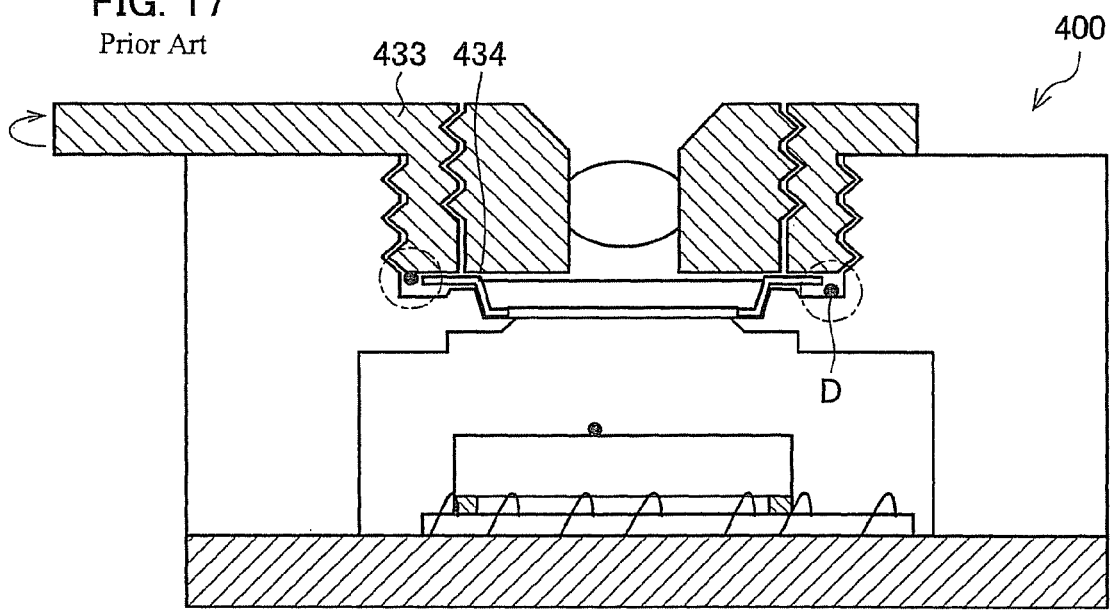
FIG. 17 is a cross-sectional view of a conventional camera module including a tension ring.
Figure 18:
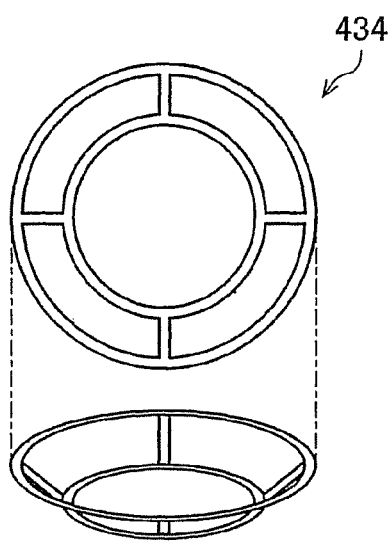
FIG. 18 shows an arrangement of the tension ring of the camera module of FIG. 17.
Figure 19:
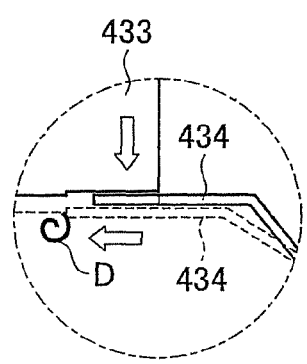
FIG. 19 shows a state of contact between the tension ring and a lens barrel in the camera module of FIG. 17.
Figure 20:
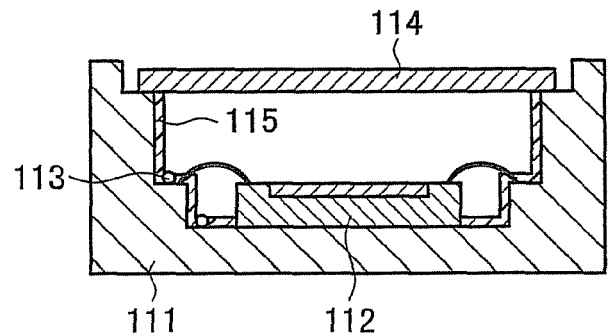
FIG. 20 is a cross-sectional view of a solid-state image pickup device described in Patent Document 1.
Figure 21:
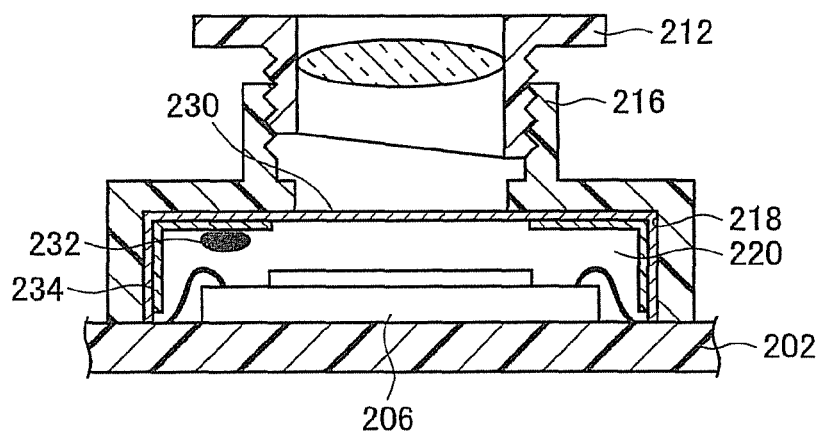
FIG. 21 is a cross-sectional view of a solid-state image pickup device described in Patent Document 2.
Figure 22:
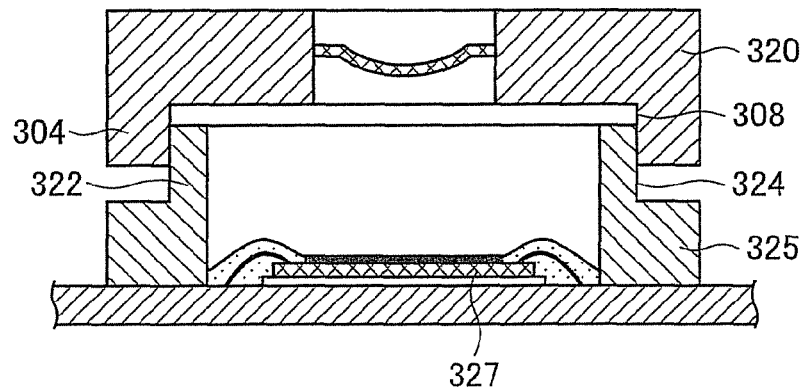
FIG. 22 is a cross-sectional view of a solid-state image pickup device described in Patent Document 3.

As described above, each of the arrangements of Patent Documents 1 and 2 employs an adhesive material to catch generated dust, and the arrangement of Patent Document 3 prevents dust from adhering to a solid-state image pickup element. That is, the arrangements of Patent Documents 1 to 3 are designed to collect generated dust generated when the solid-state image pickup devices are used. However, the arrangements of Patent Documents 1 to 3 fail to take any measures to prevent dust generation. The present inventors investigated the cause of dust generated during use of the solid-state image pickup devices. As a result, the present inventors found that there was a problem with a tension ring. FIG. 17 is a cross-sectional view of a conventional solid-state image pickup device 400 including a tension ring. FIG. 18 shows an arrangement of the tension ring. FIG. 19 shows a state of contact between the tension ring and a lens barrel (an enlarged view of a portion surrounded by a dotted line in FIG. 17). As shown in FIG. 17, the solid-state image pickup device 400 includes a metallic tension ring 434 instead of a cushioning member 34 of the present embodiment. The tension ring is a metallic member having an opening as shown in FIG. 18. As shown in FIG. 19, when the lens barrel 433 applies downward pressure, the pressure causes the tension ring 434 to stretch outward. The present inventors found that, in stretching outward, the metallic tension ring 434 generates dust D by scraping against that surface the lens barrel 433 which is in contact with the tension ring 434.

Figure 10:
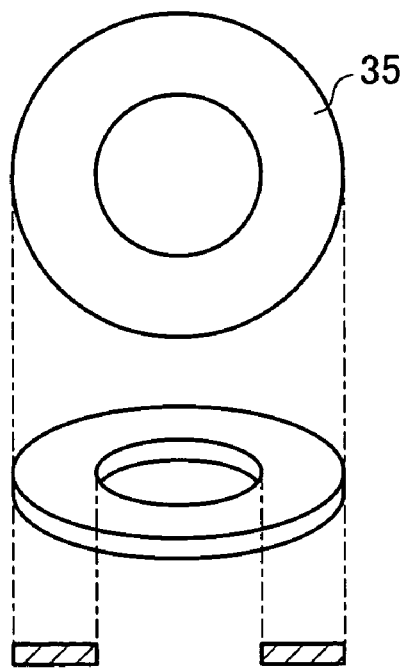
FIG. 10 shows an arrangement of a first member of the cushioning member of FIG. 6.

Therefore, it is preferable that the cushioning member 34 be made of nonmetallic material. In cases where the cushioning member 34 is constituted by the first member 35 and the second member 36 as in the camera module 1 of the present embodiment (see FIG. 6), it is only necessary that at least the first member 35 be made of nonmetallic material. FIG. 10 shows an arrangement of the first member 35.

When the cushioning member 34 disposed between the optical structure 3 and the lens holder 4 is made of nonmetallic material, the cushioning member 34 does not generate dust by scraping against the optical structure 3 (lens barrel 33). This makes it possible to prevent dust from being generated when the camera module 1 is manufactured or used.

Figure 11:
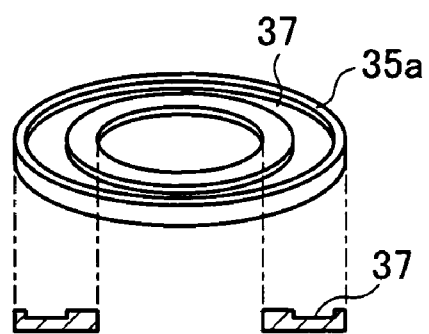
FIG. 11 is an arrangement of another first member of the cushioning member of FIG. 6.

Meanwhile, FIG. 11 shows an arrangement of another first member 35a. The first member 35a of FIG. 11 has a groove (first grooved portion) 37 formed by removing a part of that surface of the first member 35a which makes contact with the optical structure 3. That is, the groove 37 has the same center as an opening of the first member 35a does, and that surface of the first member 35a which makes contact with the optical structure 3 is partially removed. For this reason, the first member 35a makes partial contact with the optical structure 3. With this, in comparison with the arrangement, shown in FIG. 10, in which the first member 35a has no groove 37 (i.e., an arrangement in which the first member 35 makes total contact with the optical structure 3), the area of contact with the optical structure 3 becomes smaller. This makes it possible to reduce friction between the cushioning member 34 and the optical structure 3, and to thereby more surely prevent dust from being generated when the camera module 1 is manufactured or used.

In the camera module 1, the optical structure 3 moves up and down in conjunction with the rotation of the lever 5. On this occasion, the cushioning member 34 (esp., that surface of the cushioning member 34 which is in contact with the optical structure 3) is subjected to pressure. For this reason, the cushioning member 34 is preferably made of elastic rubber, resin, or elastomer. This makes it possible to efficiently absorb the impact with the elasticity of the cushioning member 34. It should be noted that a specific example of the cushioning member 34 is a washer.

Further, it is preferable that that surface of the cushioning member 34 which makes contact with the optical structure 3 (i.e., the surface of the first member 35 or 35a) be coated with a fluorocarbon resin. The "fluorocarbon resin" here means a synthetic resin obtained through polymerization of olefin containing fluorine. Examples of the fluorocarbon resin include polytetrafluoroethylene (Teflon®) and polychlorotrifluoroethylene. Among the fluorocarbon resins, polytetrafluoroethylene exhibits particularly excellent durability and lubricity, and is highly stable even in the presence of a chemical. Meanwhile, polychlorotrifluoroethylene has the advantage of being easily processed.

It should be noted that the cushioning member 34 may be coated with a fluorocarbon resin by applying the fluorocarbon resin to the nonmetallic cushioning member 34 so that the nonmetallic cushioning member 34 is coated with the fluorocarbon resin or by covering the nonmetallic cushioning member 34 with a molded article of the fluorocarbon resin.

Meanwhile, in order to catch dust generated when the camera module 1 is manufacture or used, it is preferable that at least one of back and side surfaces of the cushioning member 34 be coated with grease. The application of grease to at least one of the back and side surfaces of the cushioning member 34 makes it possible that, even if dust is generated when the camera module 1 is manufactured or used, the grease catches the dust. That is, the provision of a removing section such as a brush 50 on the back surface of the cushioning member 34 make it possible not only to remove, outward from the contact surface 4a, dust D generated when the camera module 1 is manufactured or used, but also to catch the generated dust with the grease. This makes it possible in the long term to prevent (or reduce) dust from causing an image defect.

The arrangement (shape) of a cushioning member 34 coated with grease is not particularly limited. For example, a cushioning member 34 coated with grease can be arranged as shown in FIGS. 12 through 16. Each of FIGS. 12 through 16 shows an arrangement of a cushioning member 34 whose second member 36 (see FIG. 6) has been coated with grease. Each of FIGS. 12 through 16 contains a perspective view and a side view shown below the perspective view.

Figure 12:
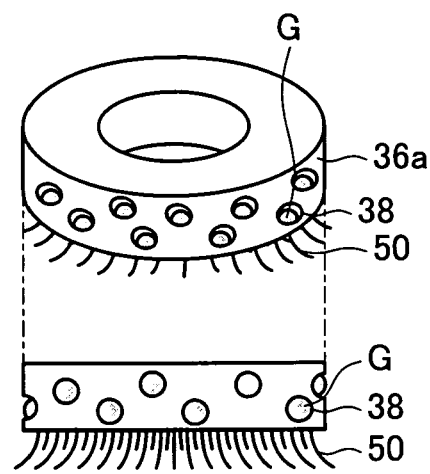
FIG. 12 is an arrangement of another second member of the cushioning member of FIG. 6.

FIG. 12 shows an arrangement in which the second member 36a has a plurality of holes 38 formed on a side surface thereof and the holes 38 have grease G injected thereinto. According to this arrangement, the holes 38 formed on the side surface of the cushioning member 34 (second member 36a) are filled with the grease G. This makes it possible that, even if dust is generated when the camera module 1 is manufactured or used, the grease G catches the dust. Furthermore, this makes it possible to hold the caught dust in the holes 38.

Figure 13:
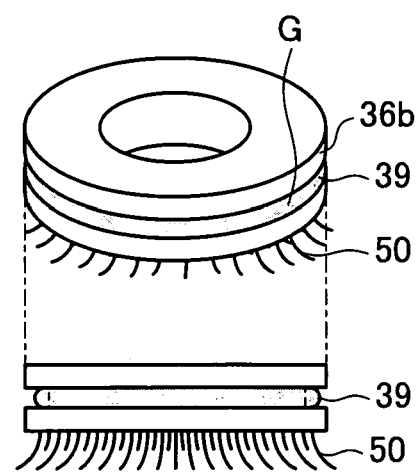
FIG. 13 is an arrangement of another second member of the cushioning member of FIG. 6.

FIG. 13 shows an arrangement in which the second member 36b has a loop groove (second grooved portion) 39 formed in a side surface thereof by removing a peripheral part of the side surface and the groove 39 has grease G injected thereinto. According to this arrangement, the groove 39 formed on the peripheral part of the side surface of the cushioning member 34 (second member 36b) has the grease G injected thereinto. This makes it possible that, even if dust is generated when the camera module 1 is manufactured or used, the grease G catches the dust. Furthermore, this makes it possible to hold the caught dust in the groove 39.

Figure 14:
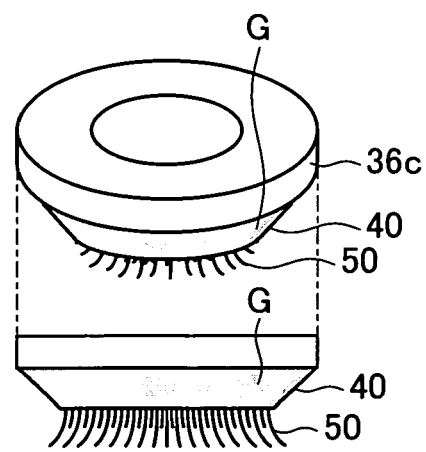
FIG. 14 is an arrangement of another second member of the cushioning member of FIG. 6.

FIG. 14 shows an arrangement in which that cross-section of the second member 36c which is parallel to that surface of the second member 36 which makes contact with the optical structure 3 becomes smaller with longer distance from the optical structure 3 and the second member 36c has a side surface coated with grease G. According to this arrangement, the cushioning member 34 (second member 36c) takes the shape of an inverted cone (taper). That is, the cushioning member 34 (second member 36c) becomes narrower toward its lower end (facing the holding section) where dust is likely to gather. Moreover, the side surface of the cushioning member 34 (second member 36c) is coated with the grease G. This makes it possible that, even if dust is generated when the camera module 1 is manufactured or used, the grease G catches the dust at the lower end of the cushioning member 34 (second member 36c) where dust is particularly likely to gather. In this arrangement, the tapered portion of the side surface of the second member 36c is entirely coated with the grease G. Therefore, the power to catch dust can be enhanced.

Figure 15:
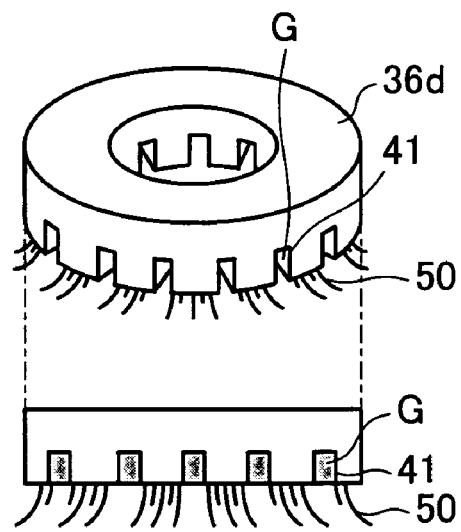
FIG. 15 is an arrangement of another second member of the cushioning member of FIG. 6.

FIG. 15 shows an arrangement in which the second member 36d has a plurality of grooves 41 so formed on a back surface thereof as to extend from an edge portion of the back surface to the center (opening) of the back surface and the grooves 41 are coated with grease G. According to this arrangement, the plurality of grooves 41 radially formed on the back surface of the cushioning member 34 (second member 36d) have the grease G injected thereinto. This makes it possible that, even if dust is generated when the camera module 1 is manufactured or used, the grease G catches the dust on the back surface of the cushioning member 34 (second member 36d) where dust is particularly likely to gather. Furthermore, this makes it possible to hold the caught dust in the grooves.

Figure 16:
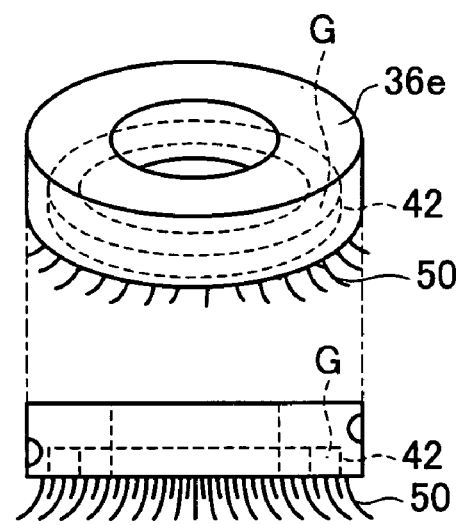
FIG. 16 is an arrangement of another second member of the cushioning member of FIG. 6.

FIG. 16 shows an arrangement in which the second member 36e has a groove (third grooved portion) formed in a back surface thereof by removing a part of that portion of the second member 36e which makes contact with a contact surface 4a of the lens holder 4 and the groove 42 has grease G injected thereinto. In other words, the second member 36e is arranged in the same manner as a reversed version of the first member 35a of FIG. 11. That is, the groove 42 formed on the back surface of the second member 36e has the same center as an opening of the second member 36e does. With this, for example, as the movement of the lever 5 causes the cushioning member 34 to switch back and forth between the state (see FIG. 1 or 3) in which the cushioning member 34 makes contact with (is pressed against) the contact surface 4a and the state (see FIG. 4 or 5) in which the cushioning member 34 makes no contact with (is released from) the contact surface 4a, the portion coated with the grease G attracts dust. This allows the grease G to catch the dust.

The grease G is a type of oily substance that takes a semi-solid or almost liquid form. For example, the grease G can be composed of semisolid (or almost solid) or paste lubricant. Usable examples of the grease G include molybdenum disulfide lubricant, white lubricant, silicone lubricant, and perfluoropolyether lubricant. Other examples of the grease G include mineral oil grease composed mainly of mineral oil, poly-α-olefin grease composed mainly of poly-α-olefin oil, silicone or fluorosilicone grease composed mainly of silicone oil, and perfluoropolyether grease composed mainly of perfluoropolyether. These types of grease G can be used alone or in combination of two or more of them. Further, the grease G may contain such additives for use in grease as lithium soap, calcium soap, and polytetrafluoroethylene (PTFE). It is preferable that the grease G be low in exudation. Preferably usable examples of the grease G include EMD-D110 (marketed as MOLYKOTE®) manufactured by Dow Corning Toray Silicone Co., Ltd.

The amount of grease G to be applied only needs to be at such a level that the dust D can be caught, and is not particularly limited. Further, the amount of grease G to be applied only needs to be set in accordance with the properties of the grease G. Further, it is only necessary to apply a larger amount of grease G to a portion where the dust D is likely to be generated.

As described above, the camera module 1 of the present embodiment has a cushioning member 34 made of nonmetallic material, and therefore can prevent dust from being generated when the camera module 1 is manufactured or used. Moreover, since the optical structure 3 is held inside of the lens holder 4, the size of the camera module 1 is not increased as in the arrangement of Patent Document 3. This makes it possible to realize a small camera module 1 while preventing dust from being generated when the camera module 1 is manufactured or used.

It should be noted that the use of the grease G brings about the following effects:

(a) The grease G can not only catch the dust D, but also coat dust having adhered to a site of application of the grease G before the grease G is applied.

(b) The grease G is so fluid as to be easily spread through the site of application.

(c) The grease G deteriorates little in properties (such physical properties such as heat resistance and weather resistance).

(d) The grease G is innocuous.

(e) The properties of the grease G can be easily changed by changing the composition of the grease G (e.g., viscosity control).

(f) The grease G requires no maintenance.

Further, the use of an adhesive material such as a thermosetting resin, a photosetting resin, or an adhesive tape instead of grease brings about the same effects.

It should be noted that a camera module 1 can be manufactured, for example, by a combination of a wiring board 2 having a solid-state image pickup element 21 and a lens holder 4, holding an optical structure 3, which has been manufactured separately from the wiring board 2. The application of grease G to a cushioning member 34 can be realized, for example, with use of a dispenser. The camera module 1 can be manufactured by a publicly-known method for manufacturing a camera module (e.g., Japanese Unexamined Patent Application Publication No. 062462/2002), except that the cushioning member 34 has a removing section such as a brush 50 provided on a back surface thereof. The publicly-known method for manufacturing a camera module will not be described below.

The present embodiment has described a camera module 1 having a macro function, but can be applied to a camera module having a focus-adjusting function such as an automatic focus (AF) function or a zoom function. The execution of these functions is likely to cause dust to be generated from the optical structure 3. However, even if the execution of each function causes dust to be generated, it is possible to catch the dust with the grease G.

As described above, a solid-state image pickup device of the present invention is arranged such that a cushioning member provided on a back surface of an optical structure includes a removing section for, when in contact with a contact surface of a holding section, removing dust on the contact surface outward from the contact surface. This brings about an effect of realizing a small solid-state image pickup device while preventing (or reducing) dust from causing an image defect.

The solid-state image pickup device of the present invention may be arranged such that the removing section is a brush.

According to the foregoing arrangement, the removing section is constituted by a brush. With this, when the brush makes contact with the contact surface of the holding section, the brush sweeps out the dust on the contact surface, so that the dust can be kept away from the optical path. This makes it possible to surely prevent (or reduce) an image defect from being caused by dust generated when the solid-state image pickup device is manufactured or used.

The solid-state image pickup device of the present invention is preferably arranged such that the brush has bristles so provided on the back surface of the optical structure as to be curled outward from the back surface of the optical structure.

According to the foregoing arrangement, the brush has bristles so provided on the back surface of the optical structure as to be curled outward from the back surface of the optical structure. In other words, the brush has bristles extending outward from the back surface of the optical structure. That is, the brush has bristles tilted outward with respect to the optical path. With this, when the brush makes contact with the contact surface of the holding section, the brush surely sweeps out the dust on the contact surface, so that the dust can be surely kept away from the optical path.

The solid-state image pickup device of the present invention is preferably arranged such that the brush has bristles of different lengths.

According to the foregoing arrangement, the removing section is constituted by a brush having bristles of different lengths. With this, when the brush makes contact with the contact surface of the holding section, all the bristles of the brush can sweep out the dust on the contact surface. Meanwhile, when the brush is taken out of contact with the contact surface of the holding section, the shorter ones of bristles are taken out of contact with the contact surface sooner than the longer ones of bristles. This makes it possible to prevent (reduce) dust removed toward the outside of the contact surface from returning to the inside of the contact surface.

The solid-state image pickup device of the present invention may be arranged such that the removing section takes a multiple-horn shape.

According to the foregoing arrangement, the removing section takes a multiple-horn (-cone) shape. In other words, the removing section takes a multiple-trumpet shape. That is, according to this arrangement, too, the removing section takes a shape curved toward the outside of the back surface of the optical structure. With this, when the removing section of a multiple-horn shape makes contact with the contact surface of the holding section, the removing section surely sweeps out the dust on the contact surface, so that the dust can be surely kept away from the optical path.

The solid-state image pickup device of the present invention is preferably arranged such that the cushioning member has at least either a back surface or a side surface coated with grease.

According to the foregoing arrangement, the cushioning member has at least either a back surface or a side surface coated with grease. Therefore, the removing section not only removes the dust on the contact surface outward from the contact surface, but also catches the dust with the grease. That is, the foregoing arrangement makes it possible not only to keep the dust away from the optical path, but also to catch the dust with the grease. This makes it possible in the long term to prevent (or reduce) the dust from causing an image defect.

The solid-state image pickup device of the present invention is preferably arranged such that that portion of the cushioning member which makes contact with the optical structure is coated with a fluorocarbon resin.

According to the foregoing arrangement, that portion of the cushioning member which makes contact with the optical structure is coated with a fluorocarbon resin excellent in durability and lubricity. This makes it possible to more surely prevent dust from being generated when the solid-state image pickup device is manufactured or used.

The solid-state image pickup device of the present invention is preferably arranged such that the cushioning member has a first grooved portion formed by removing a part of that portion of the cushioning member which makes contact with the optical structure.

According to the foregoing arrangement, that portion of the cushioning member which makes contact with the optical structure is partially removed. Therefore, the cushioning member makes partial contact with the optical structure. With this, in comparison with an arrangement in which the cushioning member has no first grooved portion (i.e., an arrangement in which the cushioning member makes total contact with the optical structure), the area of contact with the optical structure becomes smaller. This makes it possible to reduce friction between the cushioning member and the optical structure, and to thereby more surely prevent dust from being generated when the solid-state image pickup device is manufactured or used.

The solid-state image pickup device of the present invention is preferably arranged so as to have at least one of an automatic focus function, a zoom function, and a macro function.

According to the foregoing arrangement, the solid-state image pickup device has an automatic focus function, a zoom function, and a macro function that are likely to cause dust to be generated from the optical structure. This makes it possible that, even if the execution of each function causes dust to be generated, the dust can be removed outward from the contact surface of the holding section.

The solid-state image pickup device of the present invention is arranged such that the cushioning member includes the removing section for, when in contact with the contact surface of the holding section, removing dust on the contact surface outward from the contact surface. Therefore the solid-state image pickup device of the present invention can be made smaller while preventing (or reducing) dust from causing an image defect. Therefore, the solid-state image pickup device of the present invention can be suitably used for a camera-equipped mobile phone, a digital still camera, a security camera, or the like. Moreover, the application of the grease to the cushioning member allows the grease to catch dust, if any, generated when the solid-state image pickup device is used (operated or carried) or manufactured. This makes it possible to improve quality and reduce costs with a great improvement in yield.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A solid-state image pickup device comprising:
   an optical structure that forms a subject image and moves up and down along an optical path;
   a solid-state image pickup element that converts, into an electrical signal, a subject image formed by the optical structure; and
   a holding section, holding the optical structure therein, which contains the solid-state image pickup element,
   the holding section having a contact surface that makes contact with a back surface of the optical structure,
   the optical structure having a cushioning member so provided on the back surface thereof as to absorb an impact of contact between the optical structure and the holding section,
   the cushioning member having a removing section for, when in contact with the contact surface of the holding section, removing dust on the contact surface outward from the contact surface;
   wherein the removing section is a brush.

2. The solid-state image pickup device as set forth in claim 1, wherein the brush has bristles so provided on the back surface of the optical structure as to be curled outward from the back surface of the optical structure.

3. The solid-state image pickup device as set forth in claim 1, wherein the brush has bristles of different lengths.

4. The solid-state image pickup device as set forth in claim 1, wherein that portion of the cushioning member which makes contact with the optical structure is coated with a fluorocarbon resin.

5. The solid-state image pickup device as set forth in claim 1, wherein the cushioning member has a first grooved portion formed by removing a part of that portion of the cushioning member which makes contact with the optical structure.

6. The solid-state image pickup device as set forth in claim 1, wherein the solid-state image pickup device has at least one of an automatic focus function, a zoom function, and a macro function.

7. An electronic apparatus including a solid-state image pickup device, the solid-state image pickup device comprising:
   an optical structure that forms a subject image and moves up and down along an optical path;
   a solid-state image pickup element that converts, into an electrical signal, a subject image formed by the optical structure; and
   a holding section, holding the optical structure therein, which contains the solid-state image pickup element,
   the holding section having a contact surface that makes contact with a back surface of the optical structure,
   the optical structure having a cushioning member so provided on the back surface thereof as to absorb an impact of contact between the optical structure and the holding section,
   the cushioning member having a removing section for, when in contact with the contact surface of the holding section, removing dust on the contact surface outward from the contact surface;
   wherein the removing section is a brush.

* * * * *